United States Patent [19]

Gellert

[11] Patent Number: 4,557,685
[45] Date of Patent: Dec. 10, 1985

[54] HEATED NOZZLE FOR INJECTION MOLDING APPARATUS

[76] Inventor: Jobst U. Gellert, 7A Prince St., Georgetown, Ontario, Canada, L7G 2X1

[21] Appl. No.: 642,340

[22] Filed: Aug. 20, 1984

[30] Foreign Application Priority Data

Jul. 13, 1984 [CA] Canada ................................. 458899

[51] Int. Cl.$^4$ .............................. B29F 1/03; B29F 1/08
[52] U.S. Cl. ...................................... 425/549; 219/540; 239/132; 239/135; 249/78; 249/105; 264/328.15
[58] Field of Search ................ 425/549; 239/132, 135; 222/146.5; 264/328.15; 219/421, 424, 530, 540; 249/78, 105

[56] References Cited

U.S. PATENT DOCUMENTS

| | | | |
|---|---|---|---|
| 1,889,665 | 11/1932 | Johnson | 219/424 |
| 1,980,729 | 11/1934 | Loppacker | 219/424 |
| 3,604,598 | 9/1971 | Kappmeyer et al. | 222/146.5 |
| 4,238,671 | 12/1980 | Gellert | 219/530 |
| 4,344,750 | 8/1982 | Gellert | 425/549 |
| 4,345,892 | 8/1982 | Gellert | 425/549 |
| 4,355,460 | 10/1982 | Gellert | 29/611 |
| 4,386,262 | 5/1983 | Gellert | 425/549 |
| 4,403,405 | 9/1983 | Gellert | 29/611 |
| 4,446,360 | 5/1984 | Gellert | 219/424 |
| 4,492,556 | 1/1985 | Crandall | 425/549 |
| 4,514,160 | 4/1985 | Davidsmeyer | 425/143 |

FOREIGN PATENT DOCUMENTS

| | | | |
|---|---|---|---|
| 45771 | 5/1932 | Denmark | 219/530 |
| 0089335 | 5/1983 | Japan | 264/328.15 |

OTHER PUBLICATIONS

Anon., Bul. ESB-278-2M of Incoe Corp.
Anon., Bul. SSHB-35M-1178 of D-M-E Company.

Primary Examiner—Willard E. Hoag
Attorney, Agent, or Firm—Riches, McKenzie & Herbert

[57] ABSTRACT

This invention relates to an improved heated nozzle for injection molding and an improved method of manufacturing it. The nozzle has an elongated body with a melt bore extending generally centrally through it. The cylindrical outer surface of the body has a variable pitched spiral channel extending around it along its length. A helical electric heating element is embedded in the channel to form an integral structure by which the temperature of the hot melt can be maintained within a narrow range as it flows through the bore. The nozzle is manufactured by forming the body with the channel and bore either by investment casting or machining. The heating element is wound in the channel and a bead of nickel brazing paste is run along the top of it. The nozzle is then heated in a vacuum furnace to braze the heating element in the channel. The highly conductive nickel completely covers the heating element and is fused to both the heating element and the walls of the channel. Thus, a low cost integral nozzle is provided which during use efficiently dissipates heat from the element to prolong its effective life, and applies the heat uniformly along the melt bore.

6 Claims, 7 Drawing Figures

HEATED NOZZLE FOR INJECTION MOLDING APPARATUS

BACKGROUND OF THE INVENTION

This invention relates to injection molding and more particularly to an improved heated nozzle and a method of manufacturing the same.

Injection molding nozzles or sprue bushings have a central bore for conveying pressurized melt towards a gate leading to a cavity, and it is well known in the art to use a helical electric heating element to provide heat to maintain the temperature of the melt within an acceptable range. One example of this is to locate the helical heating elements between inner and outer sleeves, but this has the disadvantage that the air gap between the sleeves in which the heating element is located acts as an insulator. More recently, this problem has been overcome by vacuum casting the heating element in a highly conductive material such as copper alloy, as shown in the applicant's U.S. Pat. Nos. 4,238,671 and 4,355,460 which issued Dec. 9, 1980 and Oct. 26, 1982 respectively. This same type of structure is shown in the applicant's U.S. Pat. No. 4,403,405 which issued Sept. 13, 1983 and relates to an improved connector assembly for the nozzle. While these nozzles with cast in heating elements have worked very well, they are relatively costly to manufacture.

It is, of course, well known to provide heat to a hollow sleeve or pipe by wrapping it with insulated heating wire or tape. However, this has not been found to be satisfactory for injection molding nozzles because it is inefficient and unreliable. With the increased use of more difficult to mold plastics materials, it has become necessary to maintain the melt within narrower and narrower temperature ranges. If it rises too high degradation of the melt will result, and if it drops too low, the melt will clog in the system and produce an unacceptable product, either of which can necessitate the system being shut down for a clean out. Furthermore, if heat is not quickly removed from the element, it can result in it overheating and burning out. This danger is, of course, greater at higher temperatures, but if heat is not quickly dissipated from the heating element, it must necessarily be operated at a higher temperature to provide sufficient heat. The higher temperature itself shortens the life of the heating element and this is worse if "hot spots" occur along the length of the wire. Therefore, wrapped heating elements have not worked because the heat is not removed quickly and uniformly enough for them to be to be efficient and reliable for the latest high temperature engineering materials.

SUMMARY OF THE INVENTION

Accordingly, it is an object of the present invention to at least partially overcome these disadvantages by providing an improved nozzle and method of manufacture which is considerably less costly than those disclosed in the applicant's patents referred to above, and which provides for the rapid and uniform transfer of heat from the heating element to the body of the nozzle surrounding the melt bore.

To this end, in one of its apsects, the invention provides a heated nozzle for injection molding comprising an elongated metal body having an inlet end, an outlet end, a melt bore extending longitudinally therethrough from a melt inlet at the inlet end to a melt outlet adjacent the outlet end, and a generally cylindrical outer surface with a generally spiral channel extending therein from a first end adjacent the inlet end of the body to a second end adjacent the outlet end of the body, and an electrically insulated heating element integrally embedded in the spiral channel by a highly conductive material bonded around the heating element, the heating element having a terminal end extending from the first end of the channel whereby the controlled application of electrical power to the terminal end of the heating element heats the body surrounding the melt channel to maintain the melt flowing through the nozzle within a predetermined temperature range.

In another of its aspects, the invention further provides a method of manufacturing an integral injection molding heated nozzle, comprising the steps of forming an elongated steel body with an inlet end, an outlet end, and a generally cylindrical outer surface, the body having a melt bore extending longitudinally therethrough from a central melt inlet at the inlet end to a melt outlet adjacent the outlet end, the generally cylindrical outer surface having a generally spiral channel extending therein from a first end adjacent the inlet end of the body to a second end adjacent the outlet end of the body; locating an electrically insulated heating element in the channel to extend helically around the body of the nozzle, the heating element having a terminal end extending from the first end of the channel; applying a quantity of highly conductive material along the heating element adjacent the channel; and heating the body in a vacuum furnace for a period of time and at a temperature sufficient to melt the highly conductive material and bond it to the heating element in the channel to integrally embed the heating element in the channel.

Further objects and advantages of the invention will appear from the following description taken together with the accompanying drawings.

DESCRIPTION OF THE PREFERRED EMBODIMENTS

Figure 1:
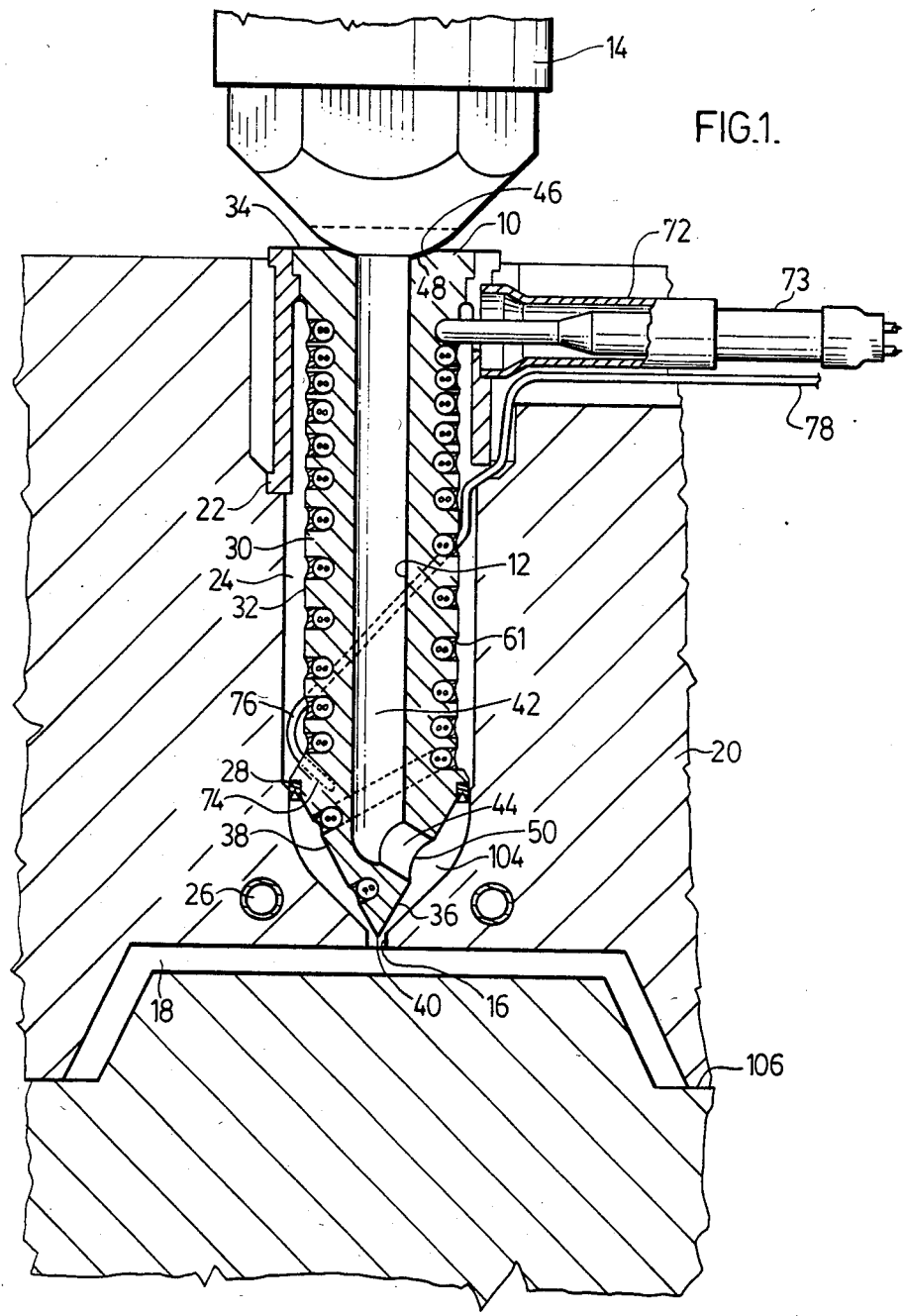
FIG. 1 is a partial sectional view of an injection molding system showing a nozzle according to a preferred embodiment of the invention.

Reference is first made to FIG. 1 which shows a nozzle 10 which has a bore 12 for conveying pressurized melt which is received from an injection molding machine 14 and flows through the gate 16 into a cavity 18. The nozzle 10 is seated in a cavity plate 20 in alignment with the gate 16 through the cavity plate 20. The heated nozzle 10 is brazed on an insulation bushing 22 which locates it to provide an insulative air space 24 between it and the surrounding cavity plate 20, which is cooled by cooling water flowing through cooling elements 26. A cylindrical seal 28 having a V-shaped cross section is seated to extend around the nozzle 10 and bridge the space 24, as described in more detail below.

The nozzle 10 has an elongated body 30 with a generally cylindrical outer surface 32 extending from an inlet end 34 to an outlet end 36. In this embodiment, the outlet end 36 has a conical surface 38 which forms a tip 40 which extends in alignment with the gate 16 for hot tip gating. However, the outlet end 36 may have other configurations for different gating arrangements, such as edge gating. The melt bore 12 has a first central portion 42 and a second relatively short diagonal portion 44. The first portion 42 extends from a recessed nozzle seat 46 at the inlet end 34 which receives the nozzle tip 48 of the molding machine 14. The second portion 44 extends outwardly from the first portion 42 to a melt outlet 50 on the conical surface 38.

Figure 6:
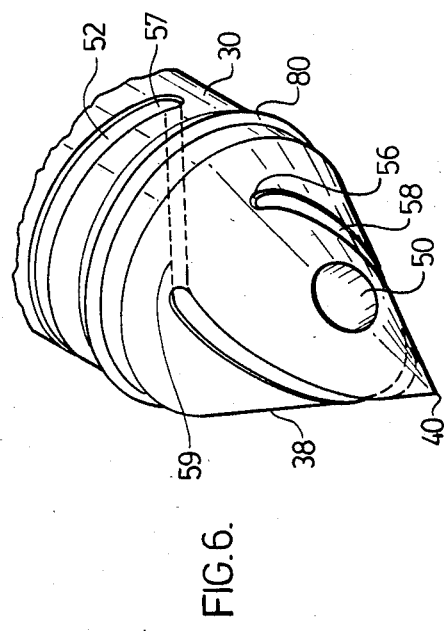
FIG. 6 is a partial isometric view showing the outlet end of the nozzle shown in FIG. 1.

The outer surface 32 of the nozzle body 30 has a generally spiralled channel 52 which normally extends from a first end 54 adjacent the inlet end 34 of the body 30 to a second end 56 adjacent the outlet end 36 of the body. In this embodiment, the channel 52 has a first spiralled portion 57 which extends from the first end 54 around the cylindrical outer surface 32 of the body, and a second portion 58 which extends to the second end 56 on the conical surface 38 of the outlet end 36 of the body. As shown in FIG. 6, these first and second portions 57,58 of the channel 52 are connected by a hole or passage 59 which is drilled through the body 30 beneath the cylindrical seal 28. As may be seen, the pitch of the first spiralled portion 57 is not necessarily uniform, and in this embodiment is tighter towards the ends where more heat is required. The second portion 58 of the channel 52 curves around the conical surface 38 where heat is required around the bore outlet 50 and all the way down to the tip 40. A generally helical heating element 60 is received in the channel 52 and passage 59 and embedded therein by a highly conductive material 61 such as nickel, which is bonded between the heating element 60 and the body 30. In this embodiment, the heating element 60 is double wire, with the chromalloy resistance wire 62 extending through a refractory powder electrical insulating material 64 such as compacted magnesium oxide powder inside a steel casing 66. The heating element 60 has an enlarged cold terminal 68 which extends from the first end 54 of the channel 52. As is known, the heating element is swedged to reduce its diameter and compact the magnesium oxide powder 64 to improve its heat transfer characteristics. The ends of the high resistance heating wire 62 are joined (not shown) near the first end 54 of the channel 52 to larger diameter terminal wires 70 which project from the cold terminal 68. A hollow connector sleeve 72 is mounted on the insulation bushing 22 to protect the cold terminal 68 of the heating element against inadvertent damage. The cold terminal 68 and connector sleeve 72 are designed to disconnectably receive a plug connector 73, as described below. A hole 74 extends diagonally into the body 30 of the nozzle 10 to removably receive a thermocouple 76 to measure the temperature adjacent the outlet end 36. The thermocouple has a lead 78 which extends through the air space 24 between the outer surface 32 and the surrounding cavity plate 20 and out beside the cold terminal 68.

Figure 2:
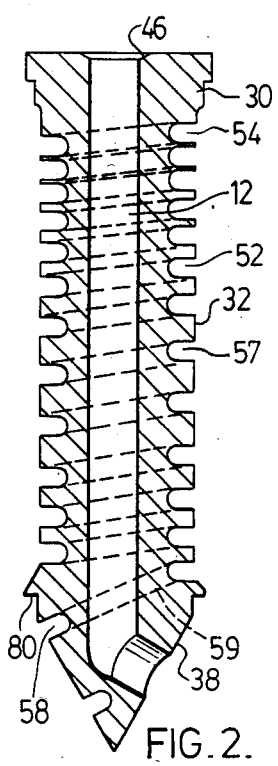
FIGS. 2, 3 and 4 are sectional views showing a sequence of steps in manufacturing the nozzle shown in FIG. 1.
Figure 3:
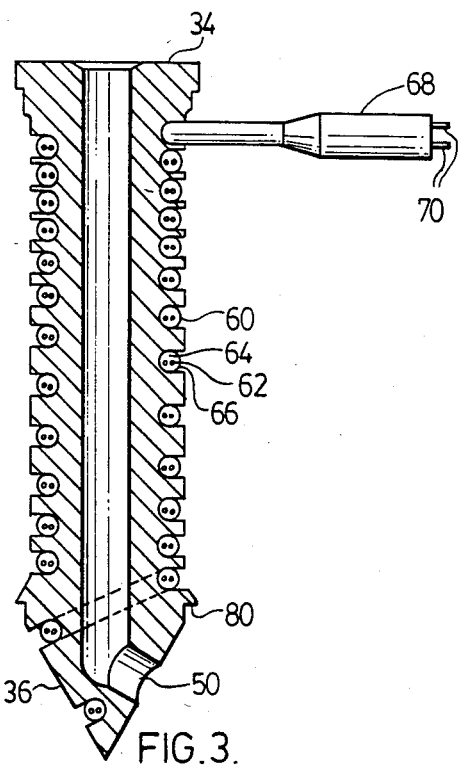

Referring now to FIGS. 2-5, the sequence of steps manufacturing the nozzle 10 according to a preferred embodiment of the invention may be seen. FIG. 2 shows the elongated steel body 30 with the melt bore 12 and spiral channel 52 which is formed of a suitable strong material such as H13 tool steel or a corrosion resistant material, such as stainless steel. The body 30 is preferably formed by investment casting, but it may also be made by drilling the melt bore 12 and passage 59, and machining the channel 52 in the generally cylindrical outer surface 32. While the outer surface 32 is described as being generally cylindrical, in this embodiment it does protrude to form a seat 80 for the cylindrical seal 28. Furthermore, as described above, this embodiment has the first and second portions 57,58 of the channel 52 connected by passage 59 which extends diagonally under the seat 80.

Figure 4:
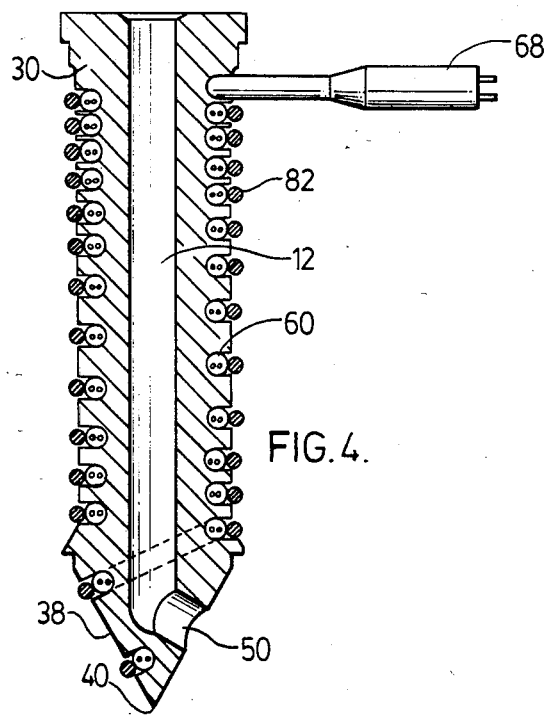
Figure 5:
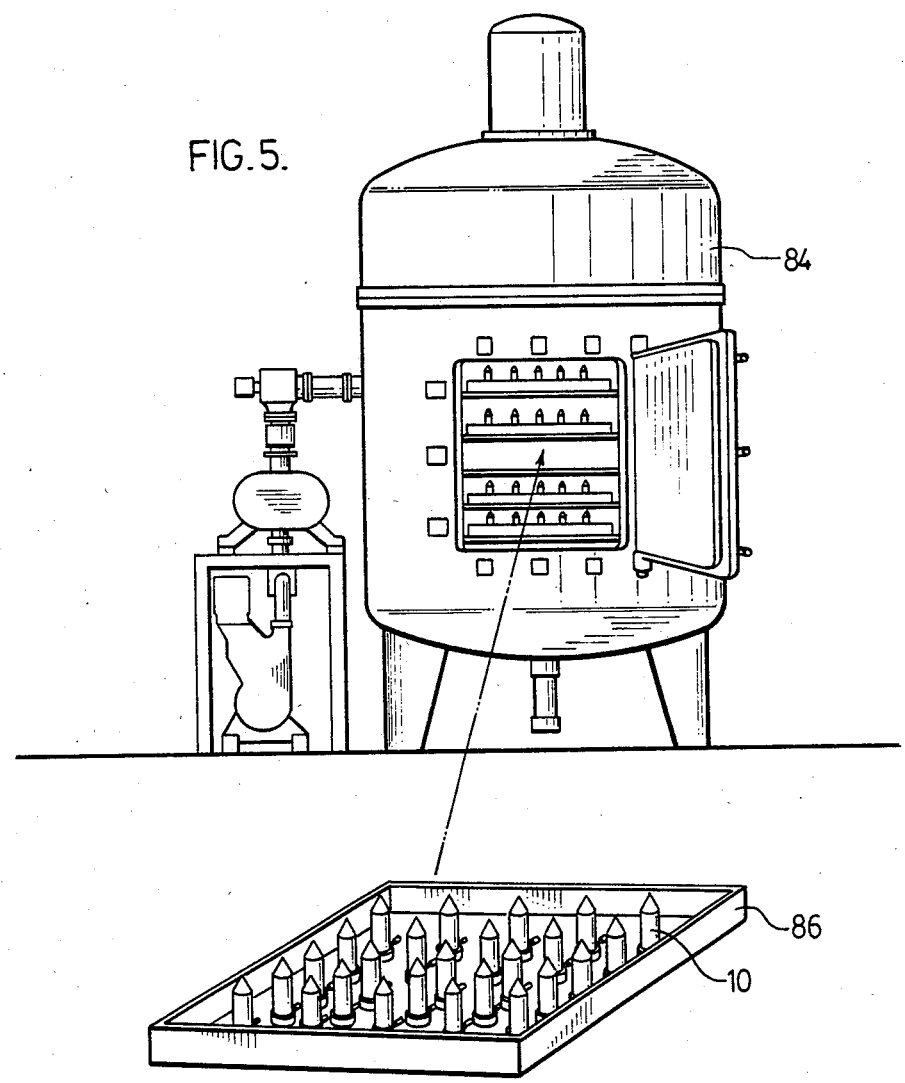
FIG. 5 shows a tray of nozzles which are heated in a vacuum furnace.

Next, the electric heating element 60 is inserted through the passage 59 and wound into the spiral channel 52 with the cold terminal 68 extending from the first end 54 of the channel. The channel 52 is slightly wider and considerably deeper than the diameter of the heating element 60, and it has been found convenient to temporarily retain the element in position as it is being wound by burring the edges of the channel at intervals along its length with a punch. Then, a bead or rope 82 of nickel brazing paste is applied along the heating element 60 in the channel, as shown in FIG. 4. In this position, the heating element 60 extends from the first end 54 of the channel 52 to the protruding cold terminal 68 and then extends around the elongated body 30 of the probe along the length of the melt bore 12. The bead of nickel paste 82 is then sprayed with a coating of acrylic lacquer to hold it in place and reduce running during brazing. A number of assembled nozzles 10 are then inserted in a vacuum furnace 84 on a tray 86 where they are heated to braze the heating element 60 in the channel 52. It is important that the period of time and temperature to which the assembled nozzles 10 are heated is sufficent to melt the nickel paste and let it run by capillary action into the channel 52 around the heating element 60. It has been found that if this is done properly, the highly conductive nickel will flow all around the heating element to completely embed it in the channel, and the nickel will be bonded to both the heating element and the channel throughout its length to form an integral construction without leaving any air spaces to cause undesirable "hot spots". While other highly conductive materials may be used for this purpose, nickel paste has been found to be particularly satisfactory. Carrying out this brazing in a vacuum furnace actually fuses the nickel to the steel which very considerably increases the rate of heat dissipation from the heating element and makes this structure superior. It is necessary that sufficient nickel cover the top of the heating element in the channel to remove the heat and thus avoid it burning out on that side. After the bonded nozzles 10 are removed from the vacuum furnace, it may be necessary to grind the outer surfaces of the nozzles to remove any excess material. This will particularly be the case on the conical surface 38 of the outlet end 36 which is in contact with the melt. Then, the insulation bushing 22 and connector sleeve 72 are mounted on the nozzle body 30 as shown. A copper brazing paste is applied to the joints between them and the nozzles 10 are reinserted into the vacuum furnace 84 to braze the insulation bushing 22 and connector sleeve 72 on to form an integral unit. In this instance, the brazing paste is copper which has a lower melting temperature than the previously applied nickel paste. Thus, this second heating step is carried out at a lower temperature which is sufficient to melt the copper but not the nickel.

Figure 7:
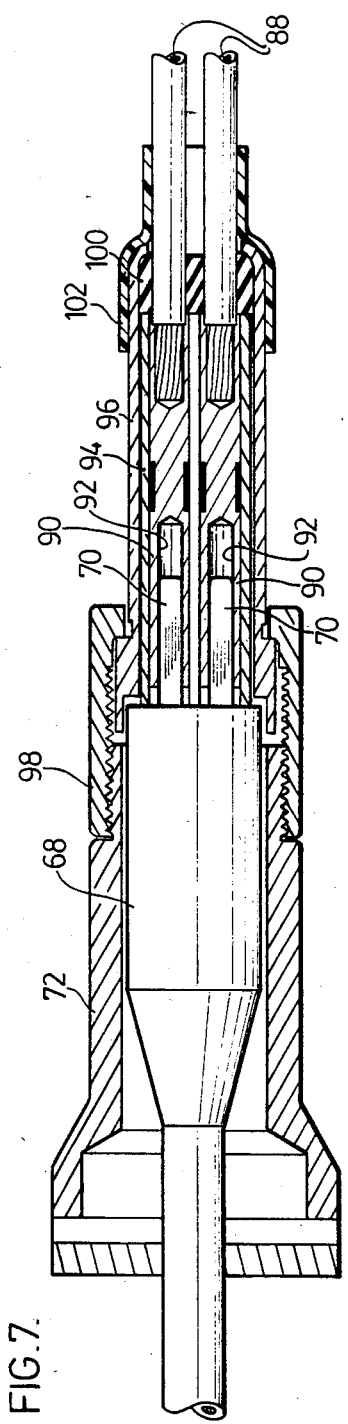
FIG. 7 is a sectional view showing the electrical connector shown in FIG. 1.

In use, the nozzle 10 is installed in an injection molding system as shown in FIG. 1. A plug connector 73 connected by wires 88 to a suitable controlled source of electric power is then screwed onto the cold terminal 68. As shown in FIG. 7, the connector 73 has a pair of brass sleeves 90 which are crimped onto the extension wires 88 at one end and have openings 92 to frictionally receive the terminal wires 70 at the other end. The brass sleeves 90 are surrounded by insulating ceramic 94 and a stainless steel casing 96. A threaded sleeve 98 screws over the connector sleeve 72 to lock the plug connector 73 in place. A silicon rubber filler 100 reduces tension on the ends of the wires 88 and a plastic shrink tube 102 also seals against moisture.

After the nozzle 10 is heated to a predetermined temperature depending upon the application, hot pressurized melt is supplied through the nozzle tip 48 of the molding machine 14 according to a predetermined injection cycle in a conventional manner. The injected melt flows through the melt bore 12 and out the outlet 50 to fill the space 104 around the conical surface 38 and through the gate 16 to fill the cavity 18. The melt which is initially injected into the space 104 is blocked by seal 28 from flowing into the air space 24, and some of it adjacent the cool cavity plate solidifies to provide thermal insulation. After the cavity 18 is filled, the high injection pressure is maintained momentarily to pack, and then released. Following a cooling period, the mold is opened along parting line 106, and the product is ejected. The mold is then closed again, injection pressure is reapplied and this cycle is repeated continuously. As mentioned above, with the increased use of less stable materials, it has become more critical to be able to maintain the melt in a narrower temperature range as it flows through the system to the gate 16. The present brazed nozzle provides this necessary degree of temperature control all the way down to the tip of the nozzle, but is considerably less costly to manufacture than the previous nozzles in which the heating element is cast into the body of the nozzle.

While the description of the invention has been given with respect to particular embodiments, it is not to be construed in a limiting sense. Many variations and modifications will now occur to those skilled in the art. For instance, it is apparent that the outlet end 36 of the nozzle body may have other configurations for different types of gating, and that the heating element may be single wire, rather than double wire as shown. Also, while a single cavity injection molding system has been shown for ease of illustration, it is apparent that this nozzle can be used for a multi-cavity application. Reference is made to the attached claims for a definition of the invention.

What I claim is:

1. A heated nozzle for injection molding comprising:
    (a) an elongated metal body having an inlet end, an outlet end, a melt bore extending longitudinally therethrough from a melt inlet at the inlet end to a melt outlet adjacent the outlet end, and a generally cylindrical outer surface with a generally spiral channel extending therein from a first end adjacent the inlet end of the body to a second end adjacent the outlet end of the body, and
    (b) an electrically insulated heating element integrally embedded in the spiral channel by a highly conductive material bonded around the heating element, the heating element having a cold terminal extending from the first end of the channel whereby the controlled application of electrical power to the terminal end of the heating element heats the body surrounding the melt channel to maintain the melt flowing through the nozzle within a predetermined temperature range.

2. A heated nozzle as claimed in claim 1 wherein the outlet end of the body has a conical surface forming a tip, and the melt bore has first and second portions, the first portion extending generally centrally from the melt inlet, the second portion being relatively short and extending diagonally from the first portion to the melt outlet located on the conical surface of the outlet end.

3. A heated nozzle as claimed in claim 2 wherein the channel has a first portion extending from the first end around the cylindrical outer surface of the body and a second portion extending to the second end on the conical surface of the outlet end of the body, a seat is provided around the cylindrical outer surface of the body to receive a cylindrical seal adjacent the conical surface of the outlet end of the body, and the heating element extends through a passage extending beneath the seat connecting the first and second portions of the channel.

4. A heated nozzle as claimed in claim 1 wherein the melt bore extends generally centrally through the body, and the outlet end of the body has a plurality of channels, each extending radially outward from the melt outlet wherethrough pressurized melt from the melt bore can flow to an edge gate leading to a cavity.

5. A heated nozzle as claimed in claim 1 wherein the pitch of the channel is tighter towards its first and second ends than inbetween.

6. A heated nozzle as claimed in claim 1 wherein the body is formed of steel.

* * * * *